(12) United States Patent
Teomim et al.

(10) Patent No.: US 9,501,830 B2
(45) Date of Patent: Nov. 22, 2016

(54) BLOB DETECTION IN NOISY IMAGES

(71) Applicant: Intel Corporation, Santa Clara, CA (US)

(72) Inventors: Noam Teomim, Jerusalem (IL); Amos Goldman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/661,248

(22) Filed: Mar. 18, 2015

(65) Prior Publication Data

US 2016/0275668 A1   Sep. 22, 2016

(51) Int. Cl.
| | |
|---|---|
| *G06K 9/00* | (2006.01) |
| *G06T 7/00* | (2006.01) |
| *G06T 7/60* | (2006.01) |
| *G06T 7/40* | (2006.01) |
| *G06T 5/00* | (2006.01) |

(52) U.S. Cl.
CPC ............... *G06T 7/004* (2013.01); *G06T 5/002* (2013.01); *G06T 7/0059* (2013.01); *G06T 7/0081* (2013.01); *G06T 7/408* (2013.01); *G06T 7/60* (2013.01); *G06T 2207/10024* (2013.01); *G06T 2207/20016* (2013.01); *G06T 2207/20141* (2013.01); *G06T 2207/20182* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 5,943,441 | A  * | 8/1999 | Michael | G06T 7/0085 382/199 |
| 8,437,502 | B1 * | 5/2013 | Siddiqui | G06T 7/0042 382/103 |
| 8,699,749 | B2 * | 4/2014 | Osako | G06T 7/0046 382/103 |
| 8,837,821 | B2 * | 9/2014 | Hirota | G06T 7/0079 382/164 |
| 2007/0253640 | A1* | 11/2007 | Brett | G06T 7/0083 382/276 |
| 2010/0166283 | A1* | 7/2010 | Grosskopf | G06T 7/0083 382/131 |

* cited by examiner

*Primary Examiner* — Soo Park
(74) *Attorney, Agent, or Firm* — Green, Howard & Mughal, LLP

(57) ABSTRACT

Techniques related to blob detection in noisy images are discussed. Such techniques may include traversing a contour associated with a candidate blob contour pixel to an inline pixel along a predetermined orientation, detecting a direction of the inline pixel with respect to the candidate blob contour pixel, and continuing to traverse the contour as a contour of the blob or detecting a second candidate blob contour pixel based on the detected direction.

25 Claims, 7 Drawing Sheets

BLOB DETECTION IN NOISY IMAGES

BACKGROUND

In imaging processing contexts such as computer vision and object detection, it may be desirable to detect blobs within image data representing a scene. For example, a blob may include a region of an image in which some property or properties are substantially constant such that the pixels of the blob may be, in some ways, similar to each other. Such blobs may be useful for object detection, object recognition, object tracking, and other computer vision implementations. For example, blobs may be associated with objects such as faces, humans, animals, automobiles, and so on.

It may be desirable to efficiently detect blobs even in noisy image data such as depth images (or depth maps) and/or noisy color images. However, current blob detection techniques may have difficulty detecting blobs in such noisy depth images and/or noisy color images. For example, such noisy depth images and/or noisy color images may include holes (e.g., small regions of pixels with missing or incorrect values). Such holes inside blobs may cause difficulty in detecting the outline of the blob as hole outlines may be mistakenly detected as part of the outline or contour of the blob. For example, edge detection techniques such as the mean shift technique that attempts to classify the blob in a second processing stage may not provide high quality blob detection in such contexts and flood fill techniques that attempt to color the entire blob may require a large amount of computational resources.

Furthermore, it may be advantageous to provide computationally efficient, low memory bandwidth, and energy efficient blob detection in both low quality (e.g., noisy) and high quality (e.g. non-noisy) images. However, current techniques may be computationally inefficient and may require large memory usage making them inefficient in terms of power usage and performance. Such limitations may cause difficulties particularly in implementations such as mobile device or wearable device implementations.

It may be advantageous to perform blob detection with greater accuracy and/or with less computational requirements. It is with respect to these and other considerations that the present improvements have been needed. Such improvements may become critical as the desire to provide high quality image processing and computer visions becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
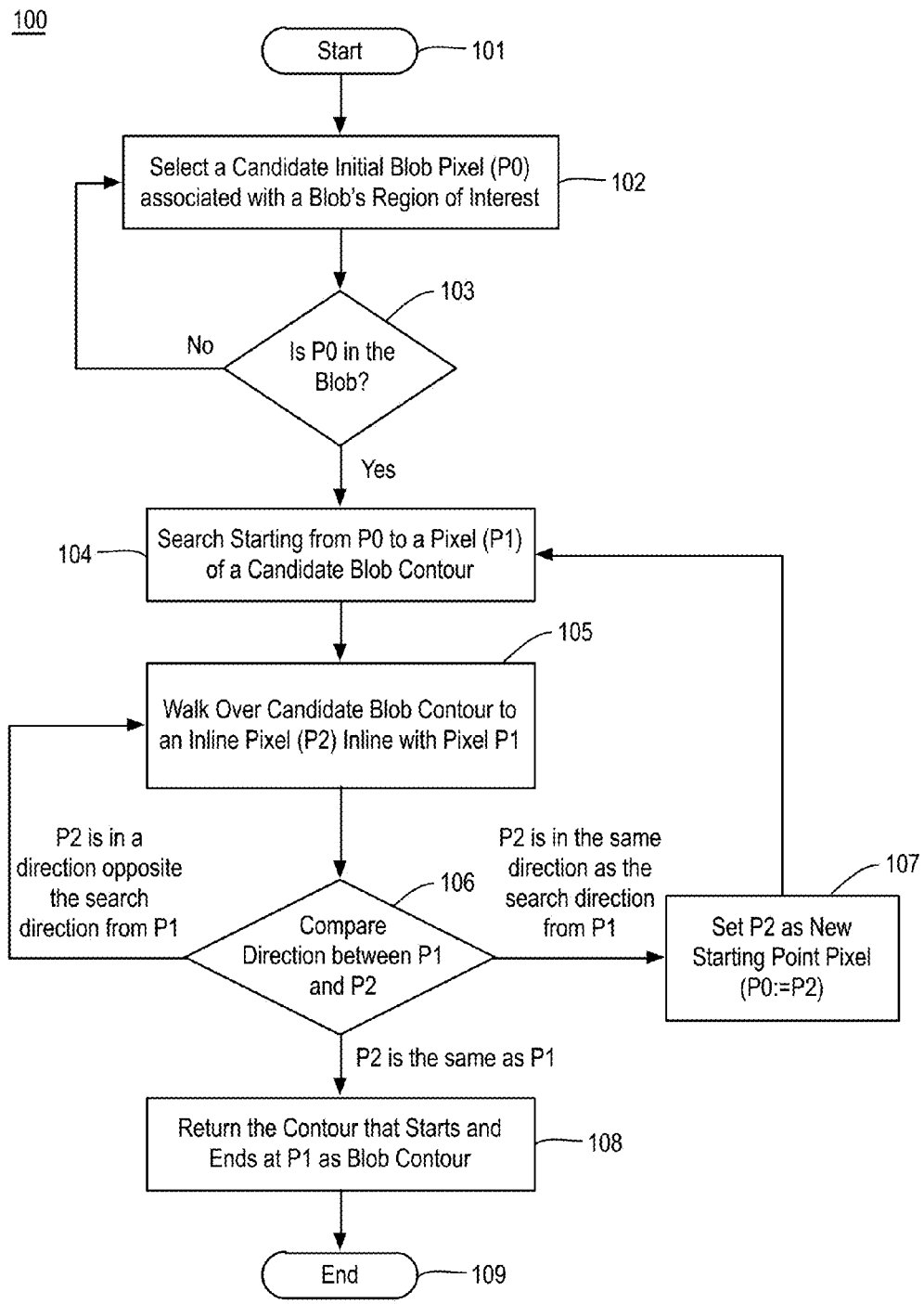
FIG. 1 illustrates an example process for performing blob detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to blob detection and, in particular, to performing blob detection based on detecting a direction between a candidate blob contour pixel and a pixel inline with the blob contour pixel and on the contour associated with the candidate blob contour pixel.

As described above, in imaging processing contexts such as computer vision and object detection, blob detection accuracy, speed, and computational efficiency may be important for providing a variety of applications such as object detection, object recognition, object tracking, computer vision, or the like. For example, it may advantageous to efficiently detect blobs even in noisy image data such as depth images (or depth maps) and/or noisy color images. For example, such images may include holes (e.g., small regions of pixels with missing or incorrect values) within the blobs that are to be detected, which may cause difficulty in the detection of the blob. Furthermore, it may be advantageous to provide computationally efficient, low memory bandwidth, and energy efficient blob detection in images of any quality. In some embodiments discussed herein, performing blob detection may include detecting a candidate blob contour pixel associated with a blob in an input image. For example, the candidate blob contour pixel may be detected by determining an initial pixel within the blob and, moving in a predetermined direction along a predetermined orientation, testing pixels for inclusion in the blob. For example, the candidate blob contour pixel may be a pixel that fails a blob inclusion test.

Based on the candidate blob contour pixel, a contour may be traversed (e.g., the contour associated with the candidate blob contour pixel may be traversed) to an inline pixel that is inline with the candidate blob contour pixel along the predetermined orientation. The predetermined orientation may be any orientation such as a vertical orientation. A direction along the predetermined orientation between the inline pixel and the candidate blob contour pixel may be determined and, based on the detected direction, the contour may continue to be traversed (e.g., the contour associated with the candidate blob contour pixel is determined to be the contour of the blob) or a second candidate blob contour pixel may be determined (e.g., the contour associated with the candidate blob contour pixel is determined to be the contour of a hole). For example, if the direction from the candidate blob contour pixel to the inline pixel is the same as the predetermined direction used to determine the inline pixel, the contour associated with the candidate blob contour pixel may be determined to be the contour of a hole and, if the direction from the candidate blob contour pixel to the inline pixel is the opposite as the predetermined direction used to determine the inline pixel, the contour associated with the candidate blob contour pixel may be determined to be the contour of the blob.

When the contour associated with the candidate blob contour pixel is determined to be the contour of the blob, processing may continue by continuing to traverse the contour to another inline pixel that is inline with the blob contour pixel (e.g., the pixel previously labeled as a candidate blob contour pixel) along the predetermined orientation. For example, the second inline pixel may be in the same pixel location as the blob contour pixel (e.g., they may be the same pixel). Based on the contour traversed, contour data (e.g., blob contour data) may be generated and outputted as the contour of a blob.

When the contour associated with the candidate blob contour pixel is determined to be the contour of a hole and a second candidate blob contour pixel has been determined, processing may continue by traversing the second contour associated with the second candidate blob contour pixel to a second inline pixel as discussed. For example, a direction along the predetermined orientation between the second inline pixel and the second candidate blob contour pixel may be determined and, based on the detected direction, the contour may continue to be traversed (e.g., the blob contour has been detected) or a third candidate blob contour pixel may be determined (e.g., another hole contour has been detected). Such processing may continue until the blob contour has been detected and traversed and the discussed blob contour data has been generated. For example, such processing may distinguish the outline of holes in the image from the real object outline for which detection is desired.

Such techniques may provide for fast blob detection, blob extraction, or contour extraction in images such as noisy images. For example, the techniques discussed herein may provide lighter computation saving power, improving performance, and more efficiently using system resources. In some implementations, the discussed techniques may, as compared to previous techniques, run up to ten times faster than previous techniques, reduce power consumption by two-thirds, and provide a 5× memory footprint reduction. Furthermore, such blob contour data may be used for computer vision, feature detection, object detection, object segmentation, object recognition, visual understanding, object removal or enhancement, shape detection, or the like.

FIG. 1 illustrates an example process 100 for performing blob detection, arranged in accordance with at least some implementations of the present disclosure. Process 100 may include one or more operations 101-109 as illustrated in FIG. 1. Process 100 may be performed by a device (e.g., device 900 or any other devices or systems discussed herein) or portions of process 100 may be performed by a device to perform blob detection. Process 100 or portions thereof may be repeated for any number blobs, potential blob regions, input images, regions of interest of an input image, video image frames, portions thereof, or the like.

As shown, process 100 may begin from start operation 101 at operation 102, "Select a Candidate Initial Blob Pixel (P0) associated with a Blob's Region of Interest", where a candidate initial blob pixel, P0, may be selected for a blob or a potential blob (e.g., an expected blob) of an input image. For example, the candidate initial blob pixel may be an initial pixel that may be tested for inclusion in the blob. For example, an input image and associated region of interest data or the like may be received and the candidate pixel may be selected based on the region of interest data. For example, the region of interest data may indicate a region of a blob or a candidate blob region or the like for the input image. The region of interest data may indicate the region using any suitable technique or techniques. For example, the region of interest may define a square, rectangle or any other shape associated with a region of an input image. Furthermore, the candidate pixel may be selected using any suitable technique or technique. For example, the candidate pixel may be selected randomly within the region of interest, at a center of the region of interest, selected based on a best guess position within the region of interest, or the like.

Figure 2:
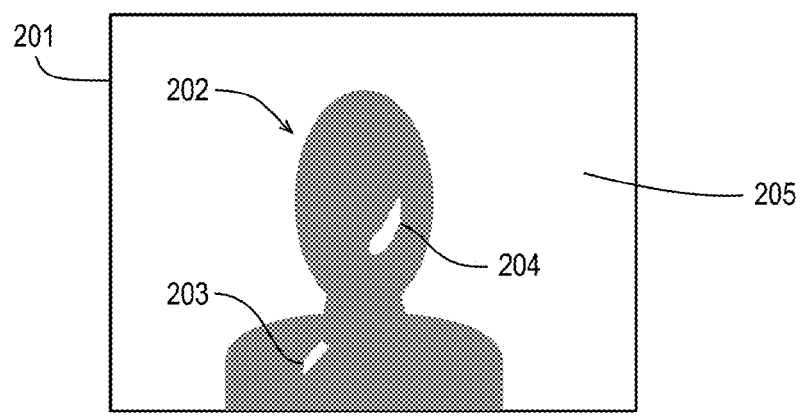
FIG. 2 illustrates an example input image including an example blob with example holes.

FIG. 2 illustrates an example input image 201 including an example blob 202 with example holes 203, 204, arranged in accordance with at least some implementations of the present disclosure. As shown in FIG. 2, input image 201 may include blob 202 having holes 203, 204 against a background 205. As used herein, input image 201 may include any suitable image data such as pixel values for pixels of input image 201 or the like. In some examples, input image 201 may be a depth image or depth map or the like such that input image 201 or associated input image data includes data for each pixel (e.g., a channel) relating to the distance of the surfaces of scene objects from a viewpoint. For example, such pixel values may be greater (or less) for objects or pixels representing objects closer to a viewpoint or a focal plane or the like. For example, each pixel of input image 201 may include a distance value associated with a distance from a viewpoint or a focal plane or the like. In other examples, input image 201 may be a color image such that input image 201 or associated input image data may a pixel value or pixel values (e.g., channels) for a particular color space such as the red-green-blue (RGB) color space or the like. For example, each pixel of input image 201 may include a value for red, a value for green, and a value for blue. Although discussed with respect to the RGB color space, input image 201 may include pixel values in any suitable color space. As discussed, in some examples, such depth image data or color image data may include holes (e.g., small regions of pixels with missing or incorrect values)

As shown, in some examples, input image 201 may include holes 203, 204 within blob 202. For example, input image 201 may be a noise image or the like. As discussed, holes 203, 204 may include missing or incorrect pixel values. As shown, in some examples, holes 203, 204 may have values that are the same as or similar to the values of background 205 as opposed to having values that are the same as or similar to the values of blob 202. In the illustrated example, input image 201 includes one blob 202 having two holes 203, 204. However, input image 201 may include any number of blobs and/or holes.

Furthermore, as discussed with respect to operation 102, region of interest data may be associated with input image 201. Region of interest data (not shown) may be associated with blob 202 such that region of interest data defines a bounding box around blob 202, for example. Input image 201 and/or such region of interest data may be received via any suitable sources. For example, input image 201 may be received from an image sensor, imaging sensor, image signal processor, imaging pipeline, or the like. Furthermore, region of interest data may be received from an image signal processor, imaging pipeline, or the like. In some examples, the region of interest data may be based on a blob detected in a previous input image (e.g., a previous image frame of a sequence of video frames).

Returning to FIG. 1, processing may continue at decision operation 103, "Is P0 in the Blob?", where a determination may be made as to whether the candidate initial blob pixel, P0, is in the blob. Such a determination may be made using any suitable technique or techniques that test a pixel for inclusion in a blob. For example, for depth images, the test for inclusion in the blob may include an absolute depth value test (e.g., determining whether a depth value of the candidate initial blob pixel is greater than or less than a threshold), a depth distance between neighboring pixels test, or the like. In some examples, the test for inclusion in the blob may include a variance test (e.g., determining whether a variance of the candidate initial blob pixel is above or below a threshold). For example, the test for inclusion in the blob may be characterized as a blob test. In some examples, the blob test may be varied based on the blob type to be detected and/or the blob test may be provided as an input. For example, the blob test to be used at operation 103 may be selected based on a blob type, selected based on how the blob is defined, selected based on how the blob is detected, selected by a user, selected based on characteristics of input image 201, or the like.

As shown, if the candidate initial blob pixel is not in the blob, process 100 may return to operation 102, where a second or another candidate initial blob pixel, P0, may be selected. For example, a candidate initial blob pixel determined to not be in the blob may be in a hole (e.g., holes 203, 204) or a background (e.g., background 205) of the input image (e.g., input image 201, please refer to FIG. 2). The second candidate initial blob pixel may be selected using any suitable technique or techniques such as randomly, based on a probing pattern, or the like. Furthermore, the second candidate initial blob pixel may be evaluated at decision operation 103 for inclusion within the blob. Such processing may continue until a candidate initial blob pixel within the blob is detected or determined. For example, operations 102 and 103 may attempt to select a best guess candidate initial blob pixel and verify the pixel is within the blob. If so, processing may continue and, if not, another pixel may be selected.

If the candidate initial blob pixel is in the blob (or a subsequently chosen candidate initial blob pixel is determined to be in the blob), the candidate initial blob pixel may be characterized as an initial blob pixel process 100 may continue at operation 104, as is discussed further below.

Figure 3:
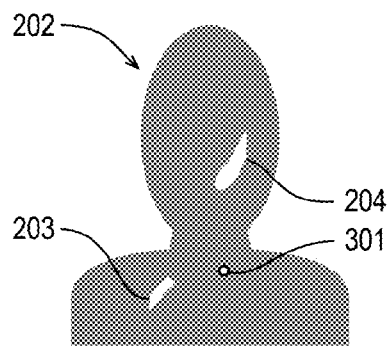
FIG. 3 illustrates an example initial blob pixel associated with the example blob.

FIG. 3 illustrates an example initial blob pixel 301 associated with blob 202, arranged in accordance with at least some implementations of the present disclosure. As shown in FIG. 3, initial blob pixel 301 may be in or within blob 202 such that initial blob pixel 301 is not within either of holes 203, 204. As discussed, initial blob pixel 301 may be located at any position within blob 202 and outside of holes 203, 204.

Returning to FIG. 1, processing may continue at operation 104, "Search Starting from P0 to a Pixel (P1) of a Candidate Blob Contour", where a search may be performed to determine a candidate blob contour pixel. The search may determine the candidate blob contour pixel using any suitable technique or techniques. Furthermore, the candidate blob contour pixel may be associated with a candidate blob contour. For example, process 100 may provide continue processing to determine whether the candidate blob contour pixel and the associated contour are part of the contour of the blob or a part of a contour of a hole.

Figure 4:
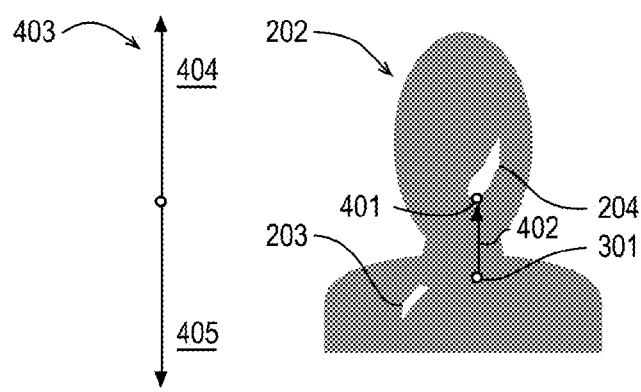
FIG. 4 illustrates an example candidate blob contour pixel associated with the example blob.

FIG. 4 illustrates an example candidate blob contour pixel 401 associated with blob 202, arranged in accordance with at least some implementations of the present disclosure. As discussed, candidate blob contour pixel 401 may be determined using any suitable technique or techniques. As shown in FIG. 4, in some examples, candidate blob contour pixel 401 may be determined by testing pixels 402 along a predetermined orientation 403 and in a predetermined direction 404 from initial blob pixel 301 for inclusion in blob 202. For example, operation 104 may begin at initial blob pixel 301 and test pixels in a particular direction (e.g., predetermined direction 404 along predetermined orientation 403) until a pixel is found that fails a blob inclusion test. The blob inclusion test may include any suitable test such as those discussed with respect to operation 103. In some examples, the blob inclusion test of operation 104 and operation 103 may be the same and, in other examples, they may be different.

As shown in FIG. 4, in some examples, predetermined orientation 403 may be a vertical orientation such that predetermined direction 404 and predetermined direction 405 may be up and down (or North and South or the like), respectively. However, predetermined orientation 403 may be any suitable orientation such as horizontal such that predetermined direction 404 and predetermined direction 405 may be left and right (or West and East or the like), respectively, 45 degree orientation, or the like. In some examples, input image 201 may be rotated prior to processing. In the discussion herein, a predetermined orientation of vertical and directions up and down may be used for the sake of clarity of presentation. However, as discussed, any suitable orientation and directions may be used.

Furthermore, in the illustrated example, candidate blob contour pixel 401 is associated with hole 204 and/or a contour of hole 204. However, candidate blob contour pixel 401 may be associated with hole 203, another hole (not shown), or a contour of blob 202 itself (e.g., as is discussed with respect to candidate blob contour pixel 601 of FIG. 6). The example of FIG. 4 is provided for the sake of clarity of presentation.

Returning to FIG. 1, processing may continue at operation 105, "Walk Over Candidate Blob Contour to an Inline Pixel (P2) Inline with Pixel P1", where the contour associated with the candidate blob contour pixel may be walked or traversed until an inline pixel is determined. For example, the inline pixel may be inline with the candidate blob contour pixel along a predetermined orientation. The contour may be traversed using any suitable technique or techniques. In some examples, the contour may be traversed using the Theo Pavlidi technique or the like. Furthermore, the inline pixel may be detected using any suitable technique or techniques. For example, an inline test may be provided (e.g., comparing horizontal or x-direction pixel location values when the predetermined orientation is vertical or comparing vertical or y-direction pixel location values when the predetermined orientation is horizontal or the like).

Figure 5:
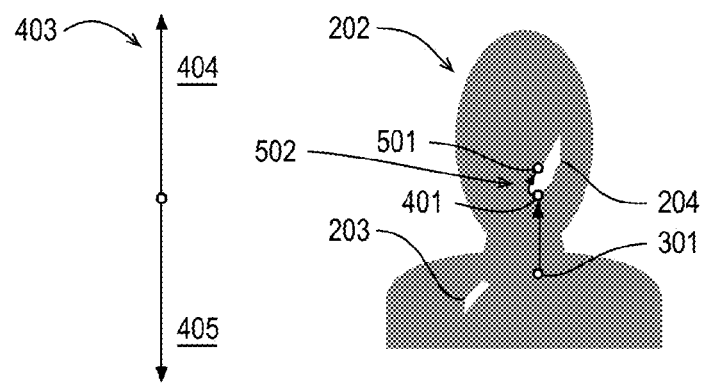
FIG. 5 illustrates an example inline pixel associated with the example blob.

FIG. 5 illustrates an example inline pixel 501 associated with blob 202, arranged in accordance with at least some implementations of the present disclosure. As discussed, inline pixel 501 may be determined using any suitable technique or techniques. As shown in FIG. 5, in some examples, inline pixel 501 may be determined by traversing a contour 502 of hole 204 (e.g., a contour associate with candidate blob contour pixel 401) until inline point 501 is reached such that inline pixel 501 is inline with candidate blob contour pixel 401 along predetermined orientation 403. For example, inline pixel 501 and candidate blob contour pixel 401 may have the same horizontal position or the same x-direction pixel location value or the like. For example, inline pixel 501 may be determined such that it is inline with candidate blob contour pixel 401 along predetermined orientation 403 based on an inline test such as a vertical inline test (e.g., the same horizontal position), a horizontal inline test (e.g., the same vertical position), or the like.

Returning to FIG. 1, processing may continue at decision operation 106, "Compare Direction between P1 and P2", where a determination may be made as to the direction between the candidate blob contour pixel determined at operation 104 and the inline pixel determined at operation 105. The determination of the direction between the candidate blob contour pixel and the inline pixel may be made using any suitable technique or techniques. For example, if the predetermined orientation is vertical, the vertical or y-direction pixel location values may be compared such that the inline pixel may be determined to be above, below, or in the same position as the candidate blob contour pixel. In examples where the predetermined orientation is horizontal, the horizontal or x-direction pixel location values may be compared such that the inline pixel may be determined to be left of, right of, or in the same position as the candidate blob contour pixel. However, as discussed, any suitable predetermined orientation may be used and a suitable direction test may be made based on the predetermined orientation.

As show, if the inline pixel, P2, is in a direction opposite the search direction (e.g., the search direction provided at operation 104) from candidate blob contour pixel, P1, processing may continue at operation 105. For example, if the inline pixel is in a direction opposite the search direction from the candidate blob contour pixel, the blob contour has been found and the contour traversing performed at operation 105 has determined a pixel on the blob contour opposite the candidate blob contour pixel (e.g., which may be characterized as a blob contour pixel based on the inline pixel being in the direction opposite the search direction). As shown, in such instances, process 100 may continue at operation 105 where the contour may be continued to walked over or traversed or the like as discussed until another inline pixel (e.g., also labeled as P2) has been determined. In such examples, the newly found inline pixel, P2, will be the same as the blob contour pixel (e.g., formerly the candidate blob contour pixel), P1.

If the inline pixel, P2, is in the same direction as the search direction from candidate blob contour pixel, P1, processing may continue at operation 107, "Set P2 as New Starting Point Pixel (P0:=P2)", where the inline pixel, P2, may be set as the new starting point pixel. For example, the initial blob pixel, P0, determined at operations 102 and 103 may be replaced with inline pixel P2. Such that the inline pixel may be characterized as an initial blob pixel or a starting point pixel or the like. For example, if the inline pixel is in the same direction as the search direction from the candidate blob contour pixel, a hole contour has been found and the traversing performed at operation has determined a pixel on the hole contour opposite the candidate blob contour pixel (e.g., which may be characterized as a non-blob contour pixel based on the inline pixel being in the same direction as the search direction). As shown, in such instances, a new initial blob pixel or starting point pixel may be established and processing may continue from operation 107 at operation 105, where a new candidate blob contour pixel may be determined (e.g., either along the blob contour or at another hole), a new inline pixel may be determined (e.g., as discussed), and decision operation 106 may be applied (e.g., also as discussed).

In such examples, the new inline pixel may be in a direction opposite the search direction from the new candidate blob contour pixel (e.g., the blob contour has been detected and the new candidate blob contour pixel may be characterized as a blob contour pixel) or the new inline pixel may be in the same direction as the search direction from the new candidate blob contour pixel (e.g., another hole has been detected). If the blob contour has been detected, processing may continue at operation 105 until an inline pixel in the same position as the blob contour pixel. If anther hole has been detected, the described processing may be repeated from operation 104.

If the inline pixel, P2, is in the same position as the candidate blob contour pixel, P1, processing may continue from operation 107 at operation 108, "Return the Contour that Starts and Ends at P1 as Blob Contour", where contour data associated with the traversed contour may be generated and provided and at end operation 109. For example, in such instances, the inline pixel, P2, has been determined for at least a second time (e.g., a prior inline pixel, P2, in a direction opposite the search direction from the candidate blob contour pixel was detected) and a candidate blob contour pixel has been characterized as a blob contour pixel. In such examples, while traversing the blob contour, operation 105 will return to the blob contour pixel. For example, the contour traversed from the blob contour pixel to the inline pixel at the same position (e.g., the blob contour pixel and inline pixel being the same pixel) is the contour of the blob and data associated with the contour may be generated and provided for use by other device modules, applications, or the like.

Returning to FIG. 5, as discussed, inline pixel 501 may be detected based on traversing contour 502 of hole 204. Furthermore, inline pixel 501 may be in the same direction as the search direction from candidate blob contour pixel 401 (e.g., direction predetermined along predetermined orientation 403). For example, with reference to decision operation 106, inline pixel 501 may be detected to be in the same direction as the search direction from candidate blob contour pixel 401. In such examples, as discussed, processing may continue at operation 107.

Figure 6:
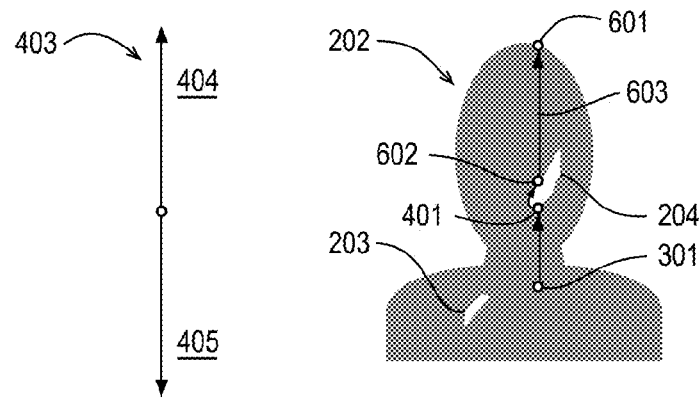
FIG. 6 illustrates an example candidate blob contour pixel associated with the example blob.

FIG. 6 illustrates an example candidate blob contour pixel 601 associated with blob 202, arranged in accordance with at least some implementations of the present disclosure. As shown in FIG. 6, inline pixel 501 may be characterized as a new initial blob pixel 602 (or a new starting pixel or the like). For example, inline pixel 501 may be characterized as a new initial blob pixel 602 at operation 107 (please refer to FIG. 1). Furthermore, candidate blob contour pixel 601 may be determined as a candidate blob contour pixel by testing pixels 603 along predetermined orientation 403 and in predetermined direction 404 from initial blob pixel 602 for inclusion in blob 202. For example, operation 104 may begin at initial blob pixel 602 and test pixels 603 until a pixel is found that fails a blob inclusion test. The blob inclusion test may include any suitable test such as those discussed herein. As discussed, in some examples, candidate blob contour pixel 601 (e.g., a candidate blob contour pixel along a contour of blob 202) may be determined based on initial blob pixel 602 and subsequent to traversing a contour associated with hole 204. In other examples, candidate blob contour pixel 601 may be determined without first traversing a contour associated with a hole or candidate blob contour pixel 601 may be determined after traversing contours associated with multiple holes.

Figure 7:
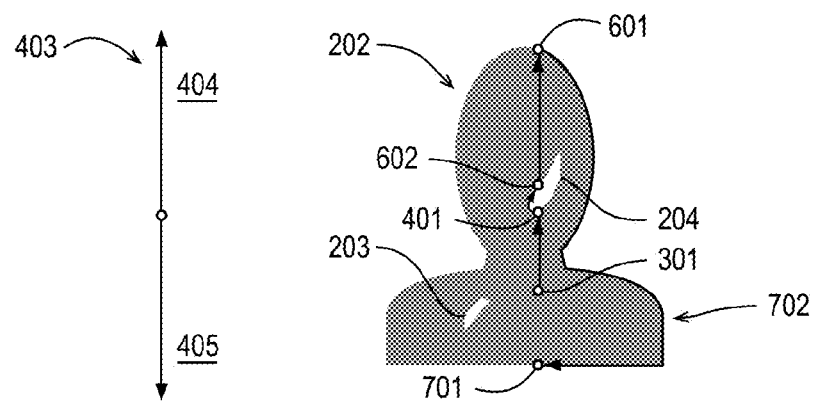
FIG. 7 illustrates an example inline pixel associated with the example blob.

FIG. 7 illustrates an example inline pixel 701 associated with blob 202, arranged in accordance with at least some implementations of the present disclosure. As discussed, inline pixel 701 may be determined using any suitable technique or techniques at operation 105 of process 100 (please refer to FIG. 1). As shown in FIG. 7, in some examples, inline pixel 701 may be determined by traversing a contour 702 of blob 202 (e.g., a contour associate with candidate blob contour pixel 601) until inline point 701 is reached such that inline pixel 501 is inline with candidate blob contour pixel 601 along predetermined orientation 403. For example, inline pixel 701 and candidate blob contour pixel 601 may have the same horizontal position or the same x-direction pixel location value or the like. For example, inline pixel 701 may be determined such that it is inline with candidate blob contour pixel 601 along predetermined orientation 403 based on an inline test such as a vertical inline test (e.g., the same horizontal position), a horizontal inline test (e.g., the same vertical position), or the like.

Furthermore, inline pixel 701 may be in a direction opposite a search direction (e.g., the search direction used to determine candidate blob contour pixel 601 from initial blob pixel 602) from candidate blob contour pixel 601 (e.g., in predetermined direction 405 along predetermined orientation 403). For example, with reference to decision operation 106, inline pixel 701 may be detected to be in the direction opposite the search direction (e.g., the search direction used at operation 104) from candidate blob contour pixel 601. In such examples, as discussed, processing may continue at operation 105 (please refer to FIG. 1). For example, processing may continue such that the traversal of contour 702 of blob 202 is continued. Furthermore, candidate blob contour pixel 601 may be characterized as a blob contour pixel based on the detected direction between inline pixel 701 and candidate blob contour pixel 601.

Figure 8:
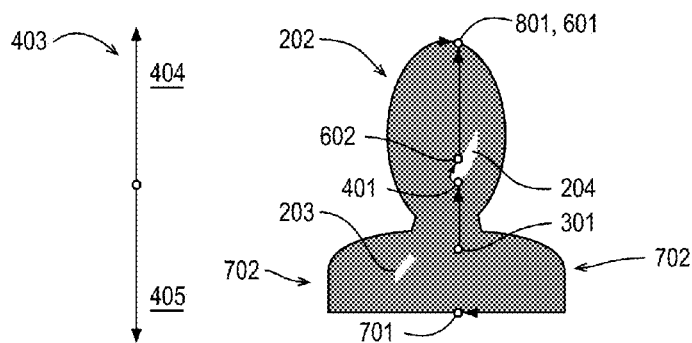
FIG. 8 illustrates an example inline pixel associated with the example blob.

FIG. 8 illustrates an example inline pixel 801 associated with blob 202, arranged in accordance with at least some implementations of the present disclosure. As discussed, from inline pixel 701 (e.g., from an inline pixel that is in an opposite direction of a search direction from the blob contour pixel), processing may continue at operation 105 to continue to traverse the blob contour (please refer to FIG. 1) until another inline pixel is determined. As shown in FIG. 8, in some examples, inline pixel 801 may be determined by traversing contour 702 of blob 202 (e.g., a contour associate with candidate blob contour pixel 601) until inline point 801 is reached such that inline pixel 801 is inline with candidate blob contour pixel 601 along predetermined orientation 403. For example, inline pixel 801 and candidate blob contour pixel 601 may have the same horizontal position or the same x-direction pixel location value or the like. For example, inline pixel 801 may be determined such that it is inline with candidate blob contour pixel 601 along predetermined orientation 403 based on an inline test such as a vertical inline test (e.g., the same horizontal position), a horizontal inline test (e.g., the same vertical position), or the like.

In this instance, as shown in FIG. 8, candidate blob contour pixel 601 and inline pixel 801 may have the same position (e.g., they may be the same pixel) as the entirety of contour 702 of blob 202 has been traversed. Furthermore, as discussed with respect to FIG. 1, at operation 108 or the like, data associated with contour 702 (e.g., contour data or blob contour data or the like) may be generated based on contour 702. Such contour data may include any suitable data such as points along contour 702, lines or segments or curves or the like representing contour 702, or any other data representing the shape of contour 702.

As discussed, the described techniques may generate blob contour data (e.g., as associated with contour 702 of blob 202) while detecting and bypassing holes such as hole 204. Such techniques may provide accurate blob detection even in the context of noisy image data. Furthermore, such techniques may be implemented with low computational and memory requirements and, therefore, with low power consumption.

For example, the techniques discussed herein may be based on observations related to blob 202. In the following discussion, an example predetermined orientation 403 of vertical is used, however, as discussed any suitable predetermined orientation 403 may be provided. For example, blob 202 may include a non-empty connected set of blob pixels (B) in an input image. Furthermore, a pixel ($p_{x1,y1}$) in the image may be exactly above a pixel ($q_{x2,y2}$) if and only if p and q have the same horizontal position in the image (e.g., x1=x2) and the vertical position of p is above q (e.g., y2>y1).

Based on such definitions, it may be observed that there exists a non empty subset of blob pixels (T) such that for every pixel ($p_{x1,y1}$) in subset T there is no other pixel ($q_{x2,y2}$) in blob pixels B such that q is exactly above p. For example, every blob has a subset of top pixels such that every pixel in that subset is positioned above all the pixels in the blob with the same horizontal position. Furthermore, for every given horizontal position there can be at most one top pixel. It may also be observed that for every pixel ($p_{x3,y3}$) in blob pixels B that is not in T there is exactly one pixel ($q_{x4,y4}$) in subset T that is exactly above pixel p. For example, every pixel in the blob which is not in the top set has exactly one top pixel above it. Also, it may be observed that all of the to' pixels in subset T are part of the blob's outline or contour.

The techniques discussed herein may utilize such observations to determine an object or blob outline or contour and walk over it without falling into holes (e.g., to traverse the true blob contour). Furthermore, as discussed, the techniques discussed herein may utilize a blob inclusion test to determine whether a pixels is included in the blob pixels B. For example, given any pixel in the input image ($p_{x5,y5}$), the blob inclusion test may determine whether p is in the blob such that such that the blob inclusion test may be based on the value of p and, in some examples, the values of other pixels in the neighborhood of p. For example, pixels that do not belong to the blob may be background pixels or hole pixels as discussed herein. The techniques discussed herein may also utilize a contour traversing technique to walk along or traverse blob contours and/or hole contours. Such contour traversing technique may, once a contour pixel is detected, search that pixel's neighborhood in order to find the next pixel in the contour and repeat such a technique to walk and detect the blob contour or hole contour over the blob's contour.

Figure 9:
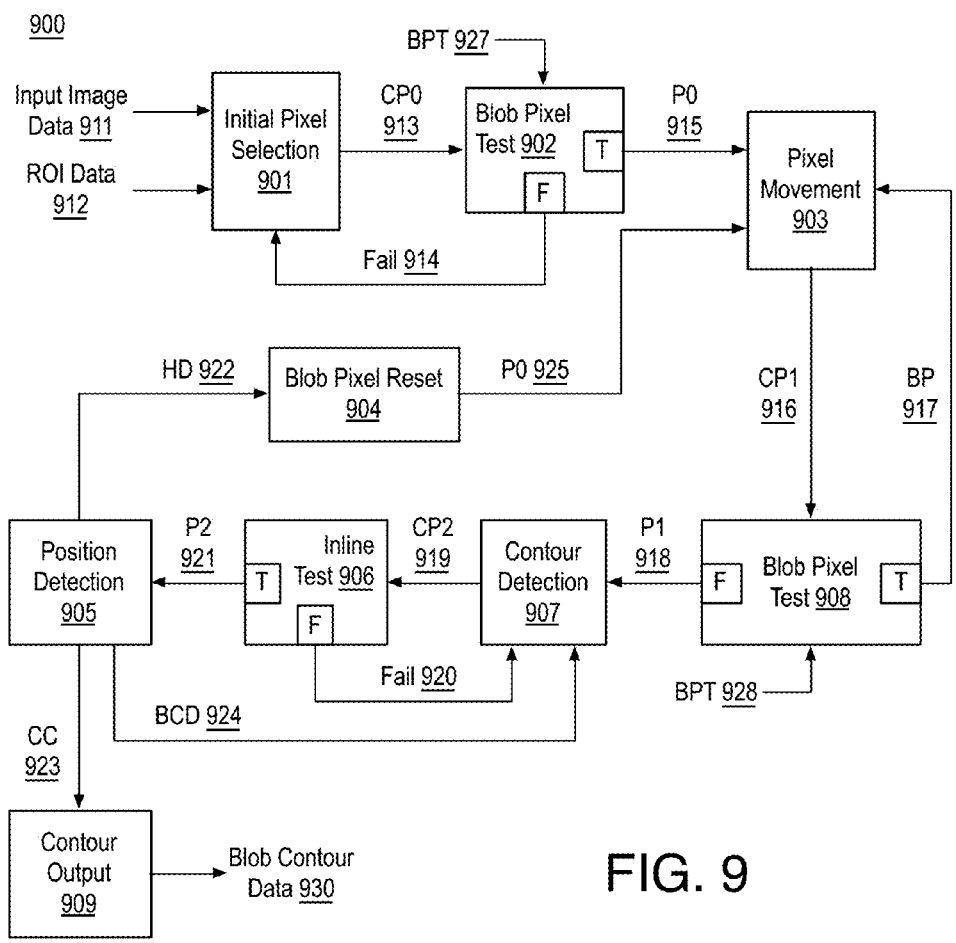
FIG. 9 illustrates an example device for performing blob detection.

FIG. 9 illustrates an example device 900 for performing blob detection, arranged in accordance with at least some implementations of the present disclosure. As shown in FIG. 9, device 900 may include an initial pixel selection module 901, a blob pixel test module 902, a pixel movement module 903, a blob pixel reset module 904, a position detection module 905, an inline test module 906, a contour detection module 907, a blob pixel test module 908, and a contour output module 909. Device 900 may be any suitable form factor device such as a computer, a laptop computer, a tablet, a smart phone, a digital camera, a scanner, a multifunction device, a gaming console, a wearable device, a display device, or the like. For example, device 900 may perform blob detection as discussed herein.

As shown, initial pixel selection module 901 may receive input image data 911 and region of interest data 912. Input image data 911 may include any suitable image or imaging data representing an image scene. In some examples, input image data 911 may be received from an image sensor, an image signal processor, an imaging pipeline, or the like. In some examples, input image data 911 may include depth image data or color image data or the like. For example, input image data 911 may include input pixel values for each pixel of an input image such as depth values or color values (e.g., across multiple color channels). Furthermore, input image data 911 may include values for any number of pixels for any type of input image. For example, the input image may include a static image, an image frame of a video sequence, a graphics frame, portions thereof, or the like. As discussed, input image data 911 may include data associated with one or more blobs and/or one or more holes. Furthermore, input image data 911 may be provided to other modules of device 900 as needed for the processing as discussed herein. Region of interest data 912 may be associated with input image data 911 and region of interest data 912 may include any suitable data indicating one or more regions of interest within input image data 911. For example, region of interest data 912 may indicate one or more regions where blobs are suspected. In some examples, region of interest data 912 may not be provided.

As shown in FIG. 9, initial pixel selection module 901 may receive input image data 911 and region of interest data 912 and initial pixel selection module 901 may generate a candidate initial blob pixel (CP0) 913. Initial pixel selection module 901 may generate candidate initial blob pixel 913 using an suitable technique or techniques such as selecting a random pixel within region of interest data 912, selecting a center pixel of region of interest data 912, applying a sampling pattern based on region of interest data 912, or the like. Initial pixel selection module 901 may provide candidate initial blob pixel 913 to blob pixel test module 902 and/or a memory of device 900 (not shown).

Blob pixel test module 902 may receive candidate initial blob pixel 913 and blob pixel test module 902 may apply a blob inclusion test to determine whether candidate initial blob pixel 913 is in a blob (e.g., whether candidate initial blob pixel 913 is a blob pixel). The blob inclusion test may include any suitable test such as an absolute depth value test, a depth distance between neighboring pixels test, a variance test, or the like. In some examples, the blob inclusion test may be received from another module of device 900 as blob pixel test 927. For example, blob pixel test module 902 may receive and apply blob pixel test 927 to determine whether candidate initial blob pixel 913 is in a blob. If not, blob pixel test module 902 may return a false value (e.g., F in FIG. 9) and blob pixel test module 902 may generate a fail signal 914. Fail signal 914 may be provided to initial pixel selection module 901 and, in response to fail signal 914, initial pixel selection module 901 may generate another candidate initial blob pixel 913 until a candidate initial blob pixel passes the blob pixel test or blob inclusion test. For example, when candidate initial blob pixel 913 is determined to be in a blob, blob pixel test module 902 may return a true value (e.g., T in FIG. 9) and blob pixel test module 902 may provide candidate initial blob pixel 913 as an initial blob pixel (P0) 915 to pixel movement module 903 and/or a memory of device 900.

Pixel movement module 903 may receive initial blob pixel 915 and pixel movement module 903 may move one pixel or the like in a predetermined direction along a predetermined orientation to generate a candidate pixel (CP1) 916. As discussed, pixel movement module 903 may move in any predetermined direction along any predetermined orientation such as up along a vertical orientation, down along a vertical orientation, left along a horizontal orientation, right along a horizontal orientation, or the like. Pixel movement module 903 may provide candidate pixel 916 to blob pixel test module 908 and/or a memory of device 900.

Blob pixel test module 908 may receive candidate pixel 916 and blob pixel test module 902 may apply a blob inclusion test to determine whether candidate pixel 916 is in a blob (e.g., whether candidate pixel 916 is a blob pixel). The blob inclusion test may include any suitable test as discussed herein. In some examples, the blob inclusion test may be received from another module of device 900 as blob pixel test 928. For example, blob pixel test module 908 may receive and apply blob pixel test 928 to determine whether candidate pixel 916 is in a blob. If so, blob pixel test module 908 may return a true value (e.g., T in FIG. 9) and blob pixel test module 908 may provide a blob pixel signal (BP) 917 to pixel movement 903. In response to blob pixel signal 917 may make another pixel movement to provide another candidate pixel 916 to blob pixel test module 908 and so on until a non-blob pixel (e.g., a contour pixel) is detected. For example, when candidate pixel 916 is determined to not be in a blob, blob pixel test module 908 may return a false value (e.g., F in FIG. 9) and blob pixel test module 908 may provide candidate blob contour pixel (P1) 918 to contour detection module 907 and/or a memory of device 900.

Contour detection module 907 may receive candidate blob contour pixel (P1) 918 and contour detection module 907 may traverse a contour associated with candidate blob contour pixel (P1) 918 to detect a candidate inline pixel (CP2) 919. Contour detection module 907 may traverse the contour using any suitable technique or techniques such as, for example, Theo Pavlidi technique or the like. Contour detection module 907 may provide candidate inline pixel 919 to inline test module 906 and/or a memory of device 900.

Inline test module 906 may receive candidate inline pixel 919 and inline test module 906 may determine whether candidate inline pixel 919 is inline with candidate blob contour pixel 918 along the predetermined orientation. Inline test module 906 may determine whether the pixels are inline using any suitable test as discussed herein. For example, if the predetermined orientation is a vertical orientation, inline test module 906 may determine whether the pixels have the same horizontal pixel location values. If not, inline test module 906 may return a false value (e.g., F in FIG. 9) and inline test module 906 may generate a fail signal 920. Fail signal 920 may be provided to contour detection module 907 and, in response to fail signal 920, contour detection module 907 may generate another candidate inline pixel 919 (e.g., another pixel along the contour) until a candidate inline pixel passes the inline pixel test. For example, when candidate inline pixel 919 is determined to be inline with candidate blob contour pixel (P1) 918, inline test module 906 may return a true value (e.g., T in FIG. 9) and inline test module 906 may provide inline pixel (P2) 921 to position detection module 905 and/or a memory of device 900.

Position detection module 905 may detect or determine a direction along the predetermined orientation between inline pixel 921 and candidate blob contour pixel 918. Position detection module 905 may detect the direction using any suitable technique or techniques such as comparing the pixel positions of inline pixel 921 and candidate blob contour pixel 918. For example, in the example of a vertical predetermined orientation with a pixel movement of up implemented by pixel movement module 903, position detection module 905 may compare vertical pixel locations or values of inline pixel 921 and candidate blob contour pixel 918. Position detection module 905 may detect the direction and/or positions of inline pixel 921 and candidate blob contour pixel 918 and position detection module 905 may provide a suitable signal for further processing.

For example, if inline pixel 921 is in the direction implemented by pixel movement module 903 from candidate blob contour pixel 918 (e.g., inline pixel 921 is directly up from candidate blob contour pixel 918 or the like), position detection module 905 may provide a hole detected (HD) signal 922 to blob pixel reset module 904. Blob pixel reset module 904 may receive hole detected signal 922 and blob pixel reset module 904 may reset the initial blob pixel as inline pixel 921 and provide the reset initial blob pixel (P0) to pixel movement module 903 for further processing as described. For example, pixel movement module 903 and blob pixel test module 908 may determine a new candidate blob contour pixel 918, contour detection module 907 and inline test module 906 may determine a new inline pixel 921, and the new inline pixel may be tested until a blob contour is detected (and candidate blob contour pixel 918 may be characterized as an actual blob contour pixel 918). In such instances, inline pixel 921 will then be in the opposite direction implemented by pixel movement module 903 from the blob contour pixel (e.g., previously candidate blob contour pixel 918).

For example, when inline pixel 921 is in the opposite direction implemented by pixel movement module 903 from candidate blob contour pixel 918 (e.g., inline pixel 921 is directly down from candidate blob contour pixel 918 or the like and candidate blob contour pixel 918 may be characterized as an actual blob contour pixel as discussed), position detection module 905 may provide a blob contour detected (BCD) signal 924 to contour detection module 907. Contour detection module 907 may receive blob contour detected signal 924 and contour detection module may continue to detect pixels along the contour (e.g., new candidate inline pixels 919) and provide such pixels to inline test module 906 until an inline pixel is detected. In such instances, the detected inline pixel (e.g., inline pixel 921) will be in the same position as the blob contour pixel (e.g., previously candidate blob contour pixel 918).

For example, when inline pixel 921 is in the same position as the blob contour pixel (e.g., inline pixel 921 is candidate blob contour pixel 918), position detection module 905 may provide a contour complete (CC) signal 923 to contour output module 907. Contour output module 909 may receive contour complete signal 923 and contour output module 909 may generate blob contour data 930 based on the blob contour traversed (e.g., the contour traversed based on blob contour detected signal 924 and contour complete signal 923). Blob contour data 930 may include any suitable contour data such as points along the contour, lines or segments or curves or the like representing the contour, or any other data representing the shape of the contour.

As discussed, in some examples, blob contour data 930 may be determined based on detecting candidate blob contour pixels and inline pixels along a predetermined orientation, comparing the relative directions or positions of such candidate blob contour pixels and inline pixels, and indicating hole contours or blob contours based on such comparisons. The techniques discussed with respect to device 900 may be applied to any number of blobs within input image data 911 and/or to any number of input images provided via input image data 911. Device 900 may provide a low memory footprint and computationally efficient blob detection technique. Blob contour data 930 may be provided to any module or the like of device 900 to implement a variety of applications such as object detection, object recognition, object tracking, computer vision, or the like.

The techniques discussed herein, may, in some examples be implemented via software. In some examples, the pseudocode provided with respect to Pseudocode (1) may be provided to implement the techniques discussed herein.
Pseudocode (1):
1 //Accept the depth image
2 start:
3 depth=camera.get( );
4 //Sample ROI until a valid point is found
5 do {
6 P0=getRandomPointInROI( );
7 } while (test(P0) false);
8 search_top_point:
9 //Move up until reaching a point with a big difference in the depth value
10 P1=P0;
11 do {
P1=(P1.x, P1.y−1);
13 } while (test(P1) true);
contour.reset( )
15 //Try to detect the contour
16 detect contour:
17 P2=P1;
18 do {
19 contour.add(P2);
P2=FindNextCountourPoint(P2);
21 } while (P2.x !=P1.x)
22 // Check which point is higher
23 if (P2.y>P1.y)
24 {
25 //return to the move up stage
26 Jump search_top_point;
else if (P2.y<P1.y)
28 {
29 //return to the detect contour stage;
30 Jump detect_conotur;
31 }
32 else
33 {
34 //return the detected contour
35 return contour;
}
37 end For example, in Pseudocode (1), as shown via annotation line 1, a depth image may be received or accepted. For example, processing may begin at execution line 2 with a start command and a depth image may be accepted at execution line 3 where a depth image may be received from a camera module. Although shown with respect to a depth image being received from a camera module, as discussed herein, in other examples, other image types such as color images may be received from other modules such as image processing modules or the like. Furthermore, Pseudocode (1) provides an example using an vertical predetermined orientation and a search direction of up, however, as discussed, any such predetermined orientation and search direction may be used.

As shown via annotation line 1, a region of interest may be sampled until a valid point is found. For example, the region of interest may be sampled until a blob pixel is determined. For example, processing at execution lines 5-7 may determine a random point (e.g., a random pixel) in a region of interest and continue to do so until a test determines the random point is in a blob (e.g., the test provides a result of true). The process may then determine a top point (e.g., a top pixel) starting from the point in the blob as shown at execution line 8. For example the top point may be determined based on a blob inclusion test such as a depth value variance, as shown at annotation line 9, or the like. For example, at execution lines 10-13, pixels in an upward direction (e.g., as y increments via y−1) may be tested to determine whether the pixel is in the blob via the text implemented at execution line 13 until a pixel is determine that provides a test result of false. For example, the top point may be a candidate blob contour pixel (P1).

As shown via annotation line 15, a contour associated with the candidate blob contour pixel (P1) may be traversed (e.g., execution line 14 may provide a reset and execution line 16 may detect the contour). For example, execution lines 17-21 may traverse a detected contour until a pixel is found with a matching horizontal value (e.g., an inline pixel (P2)) to the candidate blob contour pixel (P1), as shown at execution line 21. Next the relative positions of the candidate blob contour pixel (P1) and the inline pixel (P2) may be compared as indicated at annotation line 22. For example, if the inline pixel (P2) is higher as determined at execution line 23, the process may return to the move up stage as shown at annotation line 25 and as provided at execution line 26, and processing may continue at execution line 8 where a new candidate blob contour pixel (P1) may be found.

If the inline pixel (P2) is not higher, processing may continue to determine if the candidate blob contour pixel (P1) is higher at execution line 27. If the candidate blob contour pixel (P1) is higher as determined at execution line 27, the process may return to the detect contour stage as shown at annotation line 29 and as provided at execution line 30, and processing may continue at execution line 16 where the contour may be continue to be detected and traversed.

If the candidate blob contour pixel (P1) is not higher (e.g., the candidate blob contour pixel (P1) and the inline pixel (P2) are at the same height and are therefore the same pixel), processing may continue such that the detected contour may be returned as shown at annotation line 34 and as provided at execution line 35, and processing may end at execution line 37.

Pseudocode (1) may thereby generate a blob contour based on received input image data and region of interest data. Pseudocode (1) may implement predetermined blob detection test or Pseudocode (1) may further receive a blob detection test for implementation (e.g., via execution lines 7 and 13 as discussed).

Figure 10:
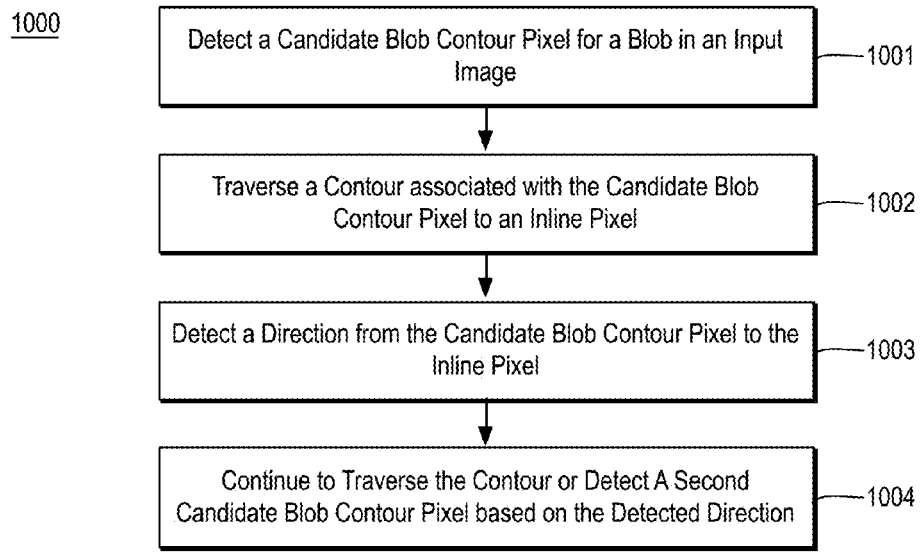
FIG. 10 is a flow diagram illustrating an example process for performing blob detection.

FIG. 10 is a flow diagram illustrating an example process 1000 for performing blob detection, arranged in accordance with at least some implementations of the present disclosure. Process 1000 may include one or more operations 1001-1004 as illustrated in FIG. 10. Process 1000 may form at least part of a blob detection process. By way of non-limiting example, process 1000 may form at least part of a blob detection process as performed by device 900 as discussed herein. Furthermore, process 1000 will be described herein with reference to system 1100 of FIG. 11.

Figure 11:
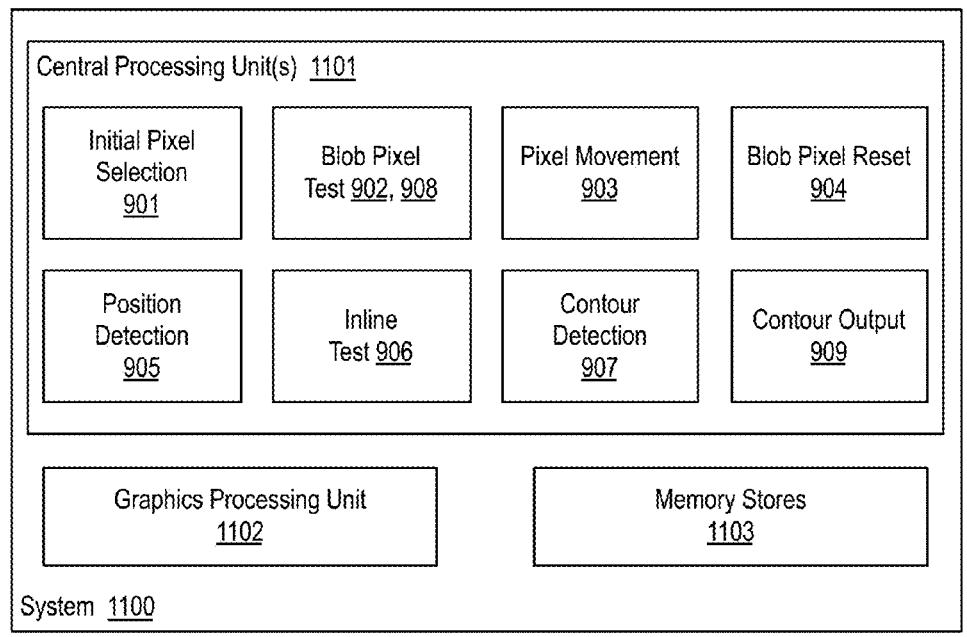
FIG. 11 is an illustrative diagram of an example system for performing blob detection.

FIG. 11 is an illustrative diagram of an example system 1100 for performing blob detection, arranged in accordance with at least some implementations of the present disclosure.

As shown in FIG. 11, system 1100 may include one or more central processing units (CPU) 1101, a graphics processing unit (GPU) 1102, and memory stores 1103. Also as shown, CPU 1101 may include initial blob selection module 901, blob pixel test module 902 and blob pixel test module 908 (which may be implemented together or separately), pixel movement module 903, blob pixel reset module 904, position detection module 905, inline test module 906, contour detection module 907, and contour output module 909. In the example of system 1100, memory stores 1103 may store imaging or related content such as input images, image data, video frames, depth image data, color data, region of interest data, pixel data such as pixel location data and/or pixel value data, orientation, position, and/or direction data, blob pixel test data, contour data, blob contour data, and/or any other data as discussed herein.

As shown, in some examples, initial blob selection module 901, blob pixel test module 902, blob pixel test module 908, pixel movement module 903, blob pixel reset module 904, position detection module 905, inline test module 906, contour detection module 907, and contour output module 909 may be implemented via central processing units 1101. In other examples, one or more or portions of initial blob selection module 901, blob pixel test module 902, blob pixel test module 908, pixel movement module 903, blob pixel reset module 904, position detection module 905, inline test module 906, contour detection module 907, and contour output module 909 may be implemented via graphics processing unit 1102, an image processing unit, an image processing pipeline, or the like.

Graphics processing unit 1102 may include any number and type of graphics processing units that may provide the operations as discussed herein. Such operations may be implemented via software or hardware or a combination thereof. For example, graphics processing unit 1102 may include circuitry dedicated to manipulate images obtained from memory stores 1103. Central processing units 1101 may include any number and type of processing units or modules that may provide control and other high level functions for system 1100 and/or provide any operations as discussed herein. Memory stores 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1103 may be implemented by cache memory. In an embodiment, one or more of initial blob selection module 901, blob pixel test module 902, blob pixel test module 908, pixel movement module 903, blob pixel reset module 904, position detection module 905, inline test module 906, contour detection module 907, and contour output module 909 (or other modules discussed herein) may be implemented via an execution unit (EU) of graphics processing unit 1102. The EU may include, for example, programmable logic or circuitry such as a logic core or cores that may provide a wide array of programmable logic functions. In an embodiment, one or more of initial blob selection module 901, blob pixel test module 902, blob pixel test module 908, pixel movement module 903, blob pixel reset module 904, position detection module 905, inline test module 906, contour detection module 907, and contour output module 909 (or other modules discussed herein) may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 may begin at operation 1001, "Detect a Candidate Blob Contour Pixel for a Blob in an Input Image", where a candidate blob contour pixel associated with a blob in an input image may be detected. The input image may be any suitable input image data as discussed herein such as depth image data or color image or the like. For example, a candidate initial blob pixel may be selected based on region of interest data associated with the input image and the candidate initial blob pixel may be tested for inclusion in the blob. If the candidate initial blob pixel passes the blob inclusion test, the candidate initial blob pixel may be characterized as an initial blob pixel. Furthermore, pixels along a predetermined orientation may be tested in a predetermined direction from the initial blob pixel for inclusion in the blob. For example, the candidate blob contour pixel may be a pixel that fails the blob inclusion test.

For example, initial pixel selection 901 as implemented via central processing unit 1101 may select the candidate initial blob pixel based on region of interest data associated with the input image. Furthermore, blob pixel test module 902 as implemented via central processing unit 1101 may test the candidate initial blob pixel for inclusion in the blob and, if not, initial pixel selection 901 may be accessed to generate another candidate initial blob pixel until an initial blob pixel is detected as discussed herein. Pixel movement module 903 as implemented via central processing unit 1101 may move in the predetermined direction along the predetermined orientation and blob pixel test module 908 as implemented via central processing unit 1101 may test whether the pixels are in the blob until the candidate blob contour pixel is detected.

Processing may continue at operation 1002, "Traverse a Contour associated with the Candidate Blob Contour Pixel to an Inline Pixel", where a contour associated with the candidate blob contour pixel may be traversed to an inline pixel that is inline with the candidate blob contour pixel along a predetermined orientation. For example, contour detection module 907 as implemented via central processing unit 1101 may detect a contour pixel and inline test module 906 may test the contour pixel until an inline pixel is detected.

Processing may continue at operation 1003, "Detect a Direction from the Candidate Blob Contour Pixel to the Inline Pixel", where a determination may be made as to whether the inline pixel is in a first direction or a second direction from the candidate blob contour pixel along the predetermined orientation may be or detected. For example, the inline pixel may be in the same direction as the pixel movement used to detect the candidate blob contour pixel or the inline pixel may be in the opposite direction as the pixel movement used to detect the candidate blob contour pixel. For example, position detection module as implemented via central processing unit 1101 may detect whether the inline pixel is in the first direction or the second direction from the candidate blob contour pixel.

Processing may continue at operation 1004, "Continue to Traverse the Contour or Detect A Second Candidate Blob Contour Pixel based on the Detected Direction", where the contour may be continued to be traversed when the inline pixel is in the first direction from the candidate blob contour pixel or a second candidate blob contour pixel may be detected when the inline pixel is in the second direction from the candidate blob contour pixel. For example, the contour may be continued to be traversed by contour detection module 907 as implemented via central processing unit 1101 or the second candidate blob contour pixel may be detected by pixel movement module 903 and blob pixel test module 908 as discussed.

For example, when the inline pixel is in the first direction from the candidate blob contour pixel (e.g., the inline pixel is in the opposite direction as the pixel movement implemented by pixel movement module 903), the blob contour may be detected and the contour may be continued to be traversed until a second inline pixel is detected. For example, contour detection module 907 may detect contour pixels and inline test module 906 may detect the second inline pixel. The second inline pixel may be provided to position detection module 905, which may indicate the second inline pixel is at the same pixel location as the candidate blob contour pixel. In such examples, the blob contour has been traversed and blob contour data associated with the blob contour may generated based on the traversing from the candidate blob contour pixel to the second inline pixel. For example, position detection module 905 may signal to contour output module 909 and contour output module 909 as implemented via central processing unit 1101 may generate the contour data.

Furthermore, when the inline pixel is in the second direction from the candidate blob contour pixel (e.g., the inline pixel is in the same direction as the pixel movement implemented by pixel movement module 903), a hole may be detected and the second candidate blob contour pixel be detected. For example, detecting the second candidate blob contour pixel may include testing pixels in the second direction along the predetermined orientation from the inline pixel for inclusion in the blob. For example, blob pixel reset module 904 as implemented via central processing unit 1101 may reset the initial blob pixel as the candidate blob contour pixel and pixel movement module 903 and blob pixel test module 908 may test pixels until a pixel fails the blob inclusion test such that the failing pixel is the second candidate blob contour pixel.

In such examples, processing may continue by traversing a second contour associated with the second candidate blob contour pixel to a second inline pixel that is inline with the second candidate blob contour pixel along the predetermined orientation, detecting the second inline pixel is in the first direction from the second candidate blob contour pixel along the predetermined orientation (e.g., the second candidate blob contour pixel and the second inline pixel are on the blob contour), and continuing to traverse the second contour. Furthermore, a third inline pixel that is inline with the second candidate blob contour pixel along the predetermined orientation may be determined (e.g., the third inline pixel and the second candidate blob contour pixel may be at the same pixel location and may be the same pixel) and contour data associated with traversing the second contour from the second candidate blob contour pixel to the third inline pixel.

Process 1000 may be repeated any number of times either in series or in parallel for any number of blobs within an input image or for any number of input images. As discussed, process 1000 may provide for a blob contour while holes within the blob are detected and avoided. For example, the discussed techniques may provide accurate blob contours even when the input image is noisy or the like.

Various components of the systems described herein may be implemented in software, firmware, and/or hardware and/or any combination thereof. For example, various components of device 900, system 1100, system 1200, or device 1300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 900, system 1100, system 1200, device 1300, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
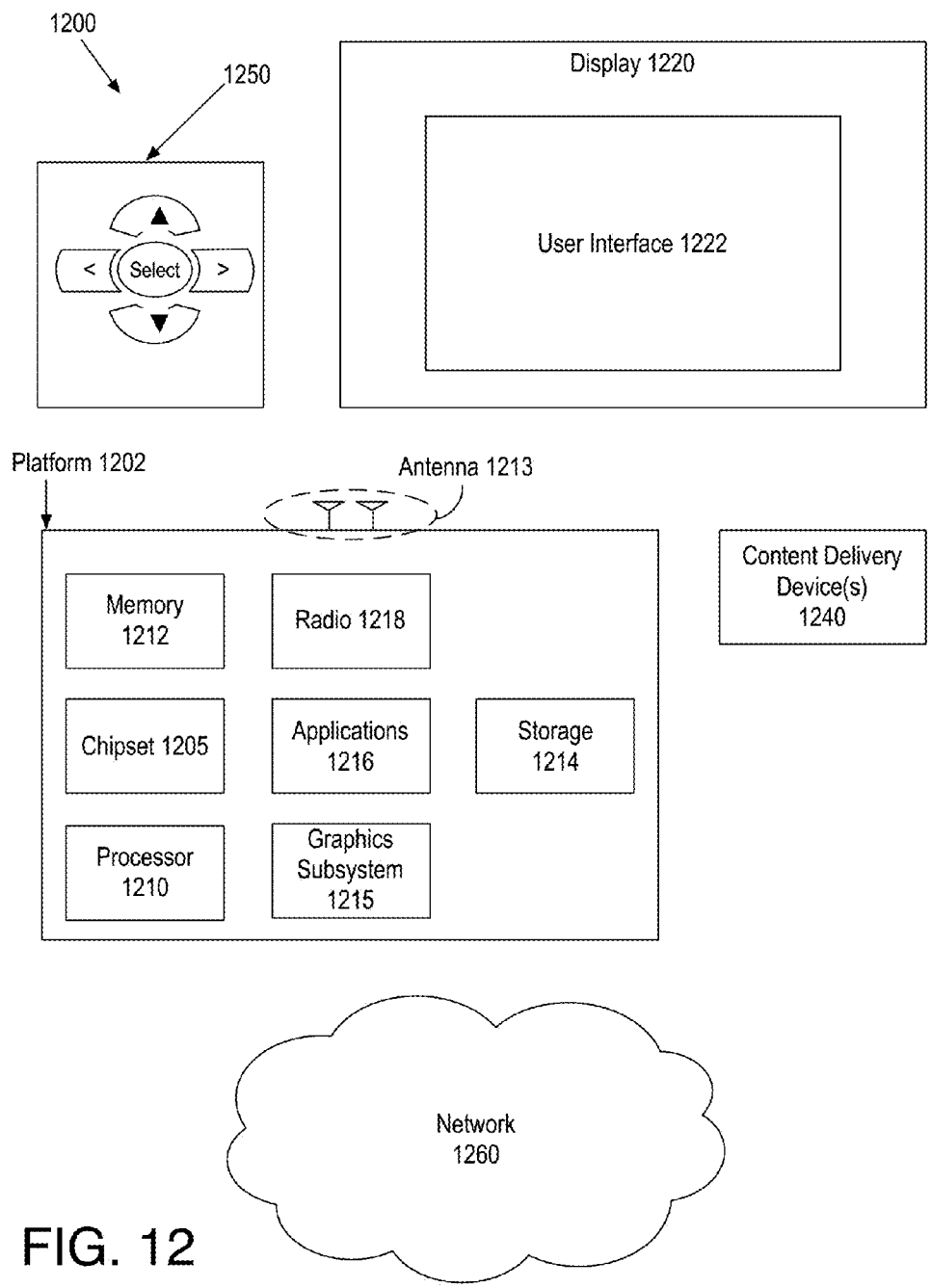
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off" In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
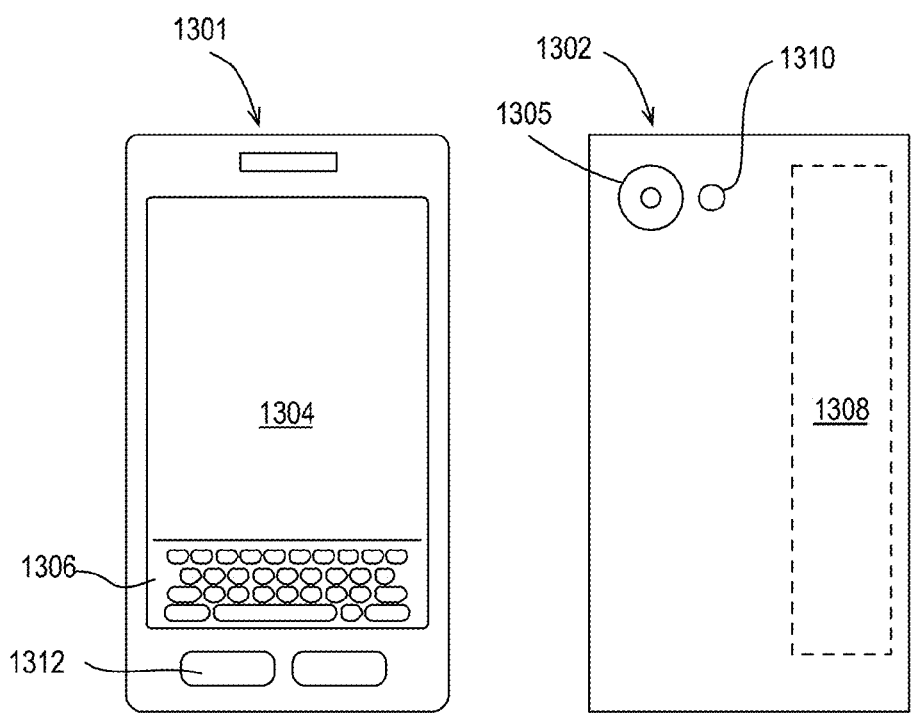
FIG. 13 illustrates an example small form factor device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 800 may be implemented via device 1300. In other examples, device 900, 1100, or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include a camera 1305 (e.g., including a lens, an aperture, and an imaging sensor) and a flash 1310 integrated into back 1302 (or elsewhere) of device 1300. In other examples, camera 1305 and flash 1310 may be integrated into front 1301 of device 1300 or both front and back cameras may be provided. Camera 1305 and flash 1310 may be components of a camera module to originate image data processed into streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for performing blob detection comprises detecting a candidate blob contour pixel associated with a blob in an input image, traversing a contour associated with the candidate blob contour pixel to an inline pixel that is inline with the candidate blob contour pixel along a predetermined orientation, detecting whether the inline pixel is in a first direction or a second direction from the candidate blob contour pixel along the predetermined orientation, and continuing to traverse the contour when the inline pixel is in the first direction from the candidate blob contour pixel or detecting a second candidate blob contour pixel when the inline pixel is in the second direction from the candidate blob contour pixel.

Further to the first embodiments, the inline pixel is in the first direction from the candidate blob contour pixel and the method further comprises determining a second inline pixel that is inline with the candidate blob contour pixel along the predetermined orientation, wherein the second inline pixel and the candidate blob contour pixel are at the same pixel location.

Further to the first embodiments, the inline pixel is in the first direction from the candidate blob contour pixel and the method further comprises determining a second inline pixel that is inline with the candidate blob contour pixel along the predetermined orientation, wherein the second inline pixel and the candidate blob contour pixel are at the same pixel location and generating contour data associated with traversing the contour from the candidate blob contour pixel to the second inline pixel.

Further to the first embodiments, the inline pixel is in the second direction from the candidate blob contour pixel and detecting the second candidate blob contour pixel comprises testing pixels in the second direction along the predetermined orientation from the inline pixel for inclusion in the blob.

Further to the first embodiments, the inline pixel is in the second direction from the candidate blob contour pixel, detecting the second candidate blob contour pixel comprises testing pixels in the second direction along the predetermined orientation from the inline pixel for inclusion in the blob, and the method further comprises traversing a second contour associated with the second candidate blob contour pixel to a second inline pixel that is inline with the second candidate blob contour pixel along the predetermined orientation, detecting the second inline pixel is in the first direction from the second candidate blob contour pixel along the predetermined orientation, and continuing to traverse the second contour.

Further to the first embodiments, the inline pixel is in the second direction from the candidate blob contour pixel, detecting the second candidate blob contour pixel comprises testing pixels in the second direction along the predetermined orientation from the inline pixel for inclusion in the blob, and the method further comprises traversing a second contour associated with the second candidate blob contour pixel to a second inline pixel that is inline with the second candidate blob contour pixel along the predetermined orientation, detecting the second inline pixel is in the first direction from the second candidate blob contour pixel along the predetermined orientation, continuing to traverse the second contour, determining a third inline pixel that is inline with the second candidate blob contour pixel along the predetermined orientation, wherein the third inline pixel and the second candidate blob contour pixel are at the same pixel location, and generating contour data associated with traversing the second contour from the second candidate blob contour pixel to the third inline pixel.

Further to the first embodiments, the method further comprises determining an initial blob pixel within the blob and testing pixels along the predetermined orientation in the second direction from the initial blob pixel for inclusion in the blob to detect the candidate blob contour pixel.

Further to the first embodiments, the method further comprises determining an initial blob pixel within the blob and testing pixels along the predetermined orientation in the second direction from the initial blob pixel for inclusion in the blob to detect the candidate blob contour pixel, wherein testing the pixels comprises at least one of an absolute depth value test or a depth distance between neighboring pixels test.

Further to the first embodiments, the method further comprises determining an initial blob pixel within the blob and testing pixels along the predetermined orientation in the second direction from the initial blob pixel for inclusion in the blob to detect the candidate blob contour pixel, wherein determining the initial blob pixel within the blob comprises selecting a candidate initial blob pixel based on region of interest data associated with the input image and testing the candidate initial blob pixel for inclusion in the blob.

Further to the first embodiments, the input data comprises at least one of depth image data or color image data.

Further to the first embodiments, the method further comprises determining an initial blob pixel within the blob, testing pixels along the predetermined orientation in the second direction from the initial blob pixel for inclusion in the blob to detect the candidate blob contour pixel, wherein the inline pixel is in the second direction from the candidate blob contour pixel, determining a second inline pixel that is inline with the candidate blob contour pixel along the predetermined orientation, wherein the second inline pixel and the candidate blob contour pixel are at the same pixel location, and generating contour data associated with traversing the contour from the candidate blob contour pixel to the second inline pixel.

In one or more second embodiments, a system for performing color conversion comprises a memory configured to receive an input image and a central processing unit coupled to the memory, the central processing unit to detect a candidate blob contour pixel associated with a blob in the input image, traverse a contour associated with the candidate blob contour pixel to an inline pixel that is inline with the candidate blob contour pixel along a predetermined orientation, detect whether the inline pixel is in a first direction or a second direction from the candidate blob contour pixel along the predetermined orientation, and continue to traverse the contour when the inline pixel is in the first direction from the candidate blob contour pixel or detect a second candidate blob contour pixel when the inline pixel is in the second direction from the candidate blob contour pixel.

Further to the second embodiments, the inline pixel is in the first direction from the candidate blob contour pixel and the central processing unit is further to determine a second inline pixel that is inline with the candidate blob contour pixel along the predetermined orientation, wherein the second inline pixel and the candidate blob contour pixel are at the same pixel location.

Further to the second embodiments, the inline pixel is in the first direction from the candidate blob contour pixel and the central processing unit is further to determine a second inline pixel that is inline with the candidate blob contour pixel along the predetermined orientation, wherein the second inline pixel and the candidate blob contour pixel are at the same pixel location, and to generate contour data associated with traversing the contour from the candidate blob contour pixel to the second inline pixel.

Further to the second embodiments, the inline pixel is in the second direction from the candidate blob contour pixel and the central processing unit to detect the second candidate blob contour pixel comprises the central processing unit to test pixels in the second direction along the predetermined orientation from the inline pixel for inclusion in the blob.

Further to the second embodiments, the inline pixel is in the second direction from the candidate blob contour pixel, the central processing unit to detect the second candidate blob contour pixel comprises the central processing unit to test pixels in the second direction along the predetermined orientation from the inline pixel for inclusion in the blob, and the central processing unit is further to traverse a second contour associated with the second candidate blob contour pixel to a second inline pixel that is inline with the second candidate blob contour pixel along the predetermined orientation, detect the second inline pixel is in the first direction from the second candidate blob contour pixel along the predetermined orientation, continue to traverse the second contour to determine a third inline pixel that is inline with the second candidate blob contour pixel along the predetermined orientation, wherein the third inline pixel and the second candidate blob contour pixel are at the same pixel location, and generate contour data associated with traversing the second contour from the second candidate blob contour pixel to the third inline pixel.

Further to the second embodiments, the central processing unit is further to determine an initial blob pixel within the blob and test pixels along the predetermined orientation in the second direction from the initial blob pixel for inclusion in the blob to detect the candidate blob contour pixel.

Further to the second embodiments, the central processing unit is further to determine an initial blob pixel within the blob and test pixels along the predetermined orientation in the second direction from the initial blob pixel for inclusion in the blob to detect the candidate blob contour pixel, wherein the central processing unit to test the pixels comprises the central processing unit to apply at least one of an absolute depth value test or a depth distance between neighboring pixels test.

Further to the second embodiments, the central processing unit is further to determine an initial blob pixel within the blob and test pixels along the predetermined orientation in the second direction from the initial blob pixel for inclusion in the blob to detect the candidate blob contour pixel, wherein the central processing unit to determine the initial blob pixel within the blob comprises the central processing unit to select a candidate initial blob pixel based on region of interest data associated with the input image and testing the candidate initial blob pixel for inclusion in the blob.

Further to the second embodiments, the input data comprises at least one of depth image data or color image data.

Further to the second embodiments, the central processing unit is further to determine an initial blob pixel within the blob, test pixels along the predetermined orientation in the second direction from the initial blob pixel for inclusion in the blob to detect the candidate blob contour pixel, wherein the inline pixel is in the second direction from the candidate blob contour pixel, determine a second inline pixel that is inline with the candidate blob contour pixel along the predetermined orientation, wherein the second inline pixel and the candidate blob contour pixel are at the same pixel location, and generate contour data associated with traversing the contour from the candidate blob contour pixel to the second inline pixel.

In one or more third embodiments, a system for performing color conversion comprises means for detecting a candidate blob contour pixel associated with a blob in an input image, means for traversing a contour associated with the candidate blob contour pixel to an inline pixel that is inline with the candidate blob contour pixel along a predetermined orientation, means for detecting whether the inline pixel is in a first direction or a second direction from the candidate blob contour pixel along the predetermined orientation, and means for continuing to traverse the contour when the inline pixel is in the first direction from the candidate blob contour pixel or detecting a second candidate blob contour pixel when the inline pixel is in the second direction from the candidate blob contour pixel.

Further to the third embodiments, the inline pixel is in the first direction from the candidate blob contour pixel and the system further comprises means for determining a second inline pixel that is inline with the candidate blob contour pixel along the predetermined orientation, wherein the second inline pixel and the candidate blob contour pixel are at the same pixel location.

Further to the third embodiments, the inline pixel is in the first direction from the candidate blob contour pixel and the system further comprises means for determining a second inline pixel that is inline with the candidate blob contour pixel along the predetermined orientation, wherein the second inline pixel and the candidate blob contour pixel are at the same pixel location, and means for generating contour data associated with traversing the contour from the candidate blob contour pixel to the second inline pixel.

Further to the third embodiments, the inline pixel is in the second direction from the candidate blob contour pixel and the means for detecting the second candidate blob contour pixel comprise means for testing pixels in the second direction along the predetermined orientation from the inline pixel for inclusion in the blob.

Further to the third embodiments, the inline pixel is in the second direction from the candidate blob contour pixel, the means for detecting the second candidate blob contour pixel comprise means for testing pixels in the second direction along the predetermined orientation from the inline pixel for inclusion in the blob, and the system further comprises means for traversing a second contour associated with the second candidate blob contour pixel to a second inline pixel that is inline with the second candidate blob contour pixel along the predetermined orientation, means for detecting the second inline pixel is in the first direction from the second candidate blob contour pixel along the predetermined orientation, and means for continuing to traverse the second contour.

Further to the third embodiments, the inline pixel is in the second direction from the candidate blob contour pixel, the means for detecting the second candidate blob contour pixel comprise means for testing pixels in the second direction along the predetermined orientation from the inline pixel for inclusion in the blob, and the system further comprises means for traversing a second contour associated with the second candidate blob contour pixel to a second inline pixel that is inline with the second candidate blob contour pixel along the predetermined orientation, means for detecting the second inline pixel is in the first direction from the second candidate blob contour pixel along the predetermined orientation, means for continuing to traverse the second contour, means for determining a third inline pixel that is inline with the second candidate blob contour pixel along the predetermined orientation, wherein the third inline pixel and the second candidate blob contour pixel are at the same pixel location, and means for generating contour data associated with traversing the second contour from the second candidate blob contour pixel to the third inline pixel.

Further to the third embodiments, the system further comprises means for determining an initial blob pixel within the blob and means for testing pixels along the predetermined orientation in the second direction from the initial blob pixel for inclusion in the blob to detect the candidate blob contour pixel.

Further to the third embodiments, the system further comprises means for determining an initial blob pixel within the blob and means for testing pixels along the predetermined orientation in the second direction from the initial blob pixel for inclusion in the blob to detect the candidate blob contour pixel, wherein the means for testing the pixels comprise means for testing at least one of an absolute depth value test or a depth distance between neighboring pixels test.

Further to the third embodiments, the system further comprises means for determining an initial blob pixel within the blob and means for testing pixels along the predetermined orientation in the second direction from the initial blob pixel for inclusion in the blob to detect the candidate blob contour pixel, wherein the means for determining the initial blob pixel within the blob comprise means for selecting a candidate initial blob pixel based on region of interest data associated with the input image and means for testing the candidate initial blob pixel for inclusion in the blob.

Further to the third embodiments, the input data comprises at least one of depth image data or color image data.

Further to the third embodiments, the system further comprises means for determining an initial blob pixel within the blob, means for testing pixels along the predetermined orientation in the second direction from the initial blob pixel for inclusion in the blob to detect the candidate blob contour pixel, wherein the inline pixel is in the second direction from the candidate blob contour pixel, means for determining a second inline pixel that is inline with the candidate blob contour pixel along the predetermined orientation, wherein the second inline pixel and the candidate blob contour pixel are at the same pixel location, and means for generating contour data associated with traversing the contour from the candidate blob contour pixel to the second inline pixel.

In one or more fourth embodiments, at least one machine readable medium comprises a plurality of instructions that, in response to being executed on a device, cause the device to perform blob detection by detecting a candidate blob contour pixel associated with a blob in an input image, traversing a contour associated with the candidate blob contour pixel to an inline pixel that is inline with the candidate blob contour pixel along a predetermined orientation, detecting whether the inline pixel is in a first direction or a second direction from the candidate blob contour pixel along the predetermined orientation, and continuing to traverse the contour when the inline pixel is in the first direction from the candidate blob contour pixel or detecting a second candidate blob contour pixel when the inline pixel is in the second direction from the candidate blob contour pixel.

Further to the fourth embodiments, the inline pixel is in the first direction from the candidate blob contour pixel and the machine readable medium comprises further instructions that, in response to being executed on the device, cause the device to perform blob detection by determining a second inline pixel that is inline with the candidate blob contour pixel along the predetermined orientation, wherein the second inline pixel and the candidate blob contour pixel are at the same pixel location.

Further to the fourth embodiments, the inline pixel is in the first direction from the candidate blob contour pixel and the machine readable medium comprises further instructions that, in response to being executed on the device, cause the device to perform blob detection by determining a second inline pixel that is inline with the candidate blob contour pixel along the predetermined orientation, wherein the second inline pixel and the candidate blob contour pixel are at the same pixel location and generating contour data associated with traversing the contour from the candidate blob contour pixel to the second inline pixel.

Further to the fourth embodiments, the inline pixel is in the second direction from the candidate blob contour pixel and detecting the second candidate blob contour pixel comprises testing pixels in the second direction along the predetermined orientation from the inline pixel for inclusion in the blob.

Further to the fourth embodiments, the inline pixel is in the second direction from the candidate blob contour pixel, detecting the second candidate blob contour pixel comprises testing pixels in the second direction along the predetermined orientation from the inline pixel for inclusion in the blob, and the machine readable medium comprises further instructions that, in response to being executed on the device, cause the device to perform blob detection by traversing a second contour associated with the second candidate blob contour pixel to a second inline pixel that is inline with the second candidate blob contour pixel along the predetermined orientation, detecting the second inline pixel is in the first direction from the second candidate blob contour pixel along the predetermined orientation, continuing to traverse the second contour, determining a third inline pixel that is inline with the second candidate blob contour pixel along the predetermined orientation, wherein the third inline pixel and the second candidate blob contour pixel are at the same pixel location, and generating contour data associated with traversing the second contour from the second candidate blob contour pixel to the third inline pixel.

Further to the fourth embodiments, the machine readable medium comprises further instructions that, in response to being executed on the device, cause the device to perform blob detection by determining an initial blob pixel within the blob and testing pixels along the predetermined orientation in the second direction from the initial blob pixel for inclusion in the blob to detect the candidate blob contour pixel.

Further to the fourth embodiments, the machine readable medium comprises further instructions that, in response to being executed on the device, cause the device to perform blob detection by determining an initial blob pixel within the blob and testing pixels along the predetermined orientation in the second direction from the initial blob pixel for inclusion in the blob to detect the candidate blob contour pixel, wherein determining the initial blob pixel within the blob comprises selecting a candidate initial blob pixel based on region of interest data associated with the input image and testing the candidate initial blob pixel for inclusion in the blob.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing blob detection comprising:
    detecting a candidate blob contour pixel associated with a blob in an input image;
    traversing a contour associated with the candidate blob contour pixel to an inline pixel that is inline with the candidate blob contour pixel along a predetermined orientation;
    detecting whether the inline pixel is in a first direction or a second direction from the candidate blob contour pixel along the predetermined orientation; and
    continuing to traverse the contour when the inline pixel is in the first direction from the candidate blob contour pixel or detecting a second candidate blob contour pixel when the inline pixel is in the second direction from the candidate blob contour pixel.

2. The method of claim 1, wherein the inline pixel is in the first direction from the candidate blob contour pixel, the method further comprising:
    determining a second inline pixel that is inline with the candidate blob contour pixel along the predetermined orientation, wherein the second inline pixel and the candidate blob contour pixel are at the same pixel location.

3. The method of claim 2, further comprising:
    generating contour data associated with traversing the contour from the candidate blob contour pixel to the second inline pixel.

4. The method of claim 1, wherein the inline pixel is in the second direction from the candidate blob contour pixel, and wherein detecting the second candidate blob contour pixel comprises testing pixels in the second direction along the predetermined orientation from the inline pixel for inclusion in the blob.

5. The method of claim 4, further comprising:
    traversing a second contour associated with the second candidate blob contour pixel to a second inline pixel that is inline with the second candidate blob contour pixel along the predetermined orientation;
    detecting the second inline pixel is in the first direction from the second candidate blob contour pixel along the predetermined orientation; and
    continuing to traverse the second contour.

6. The method of claim 5, further comprising:
    determining a third inline pixel that is inline with the second candidate blob contour pixel along the predetermined orientation, wherein the third inline pixel and the second candidate blob contour pixel are at the same pixel location; and
    generating contour data associated with traversing the second contour from the second candidate blob contour pixel to the third inline pixel.

7. The method of claim 1, further comprising:
    determining an initial blob pixel within the blob; and
    testing pixels along the predetermined orientation in the second direction from the initial blob pixel for inclusion in the blob to detect the candidate blob contour pixel.

8. The method of claim 7, wherein testing the pixels comprises at least one of an absolute depth value test or a depth distance between neighboring pixels test.

9. The method of claim 7, wherein determining the initial blob pixel within the blob comprises selecting a candidate initial blob pixel based on region of interest data associated with the input image and testing the candidate initial blob pixel for inclusion in the blob.

10. The method of claim 1, wherein the input image comprises at least one of depth image data or color image data.

11. The method of claim 1, further comprising:
    determining an initial blob pixel within the blob;
    testing pixels along the predetermined orientation in the second direction from the initial blob pixel for inclusion in the blob to detect the candidate blob contour pixel, wherein the inline pixel is in the second direction from the candidate blob contour pixel;
    determining a second inline pixel that is inline with the candidate blob contour pixel along the predetermined orientation, wherein the second inline pixel and the candidate blob contour pixel are at the same pixel location; and
    generating contour data associated with traversing the contour from the candidate blob contour pixel to the second inline pixel.

12. A system for performing color conversion comprising:
    a memory configured to receive an input image; and
    a central processing unit coupled to the memory, the central processing unit to detect a candidate blob contour pixel associated with a blob in the input image, traverse a contour associated with the candidate blob contour pixel to an inline pixel that is inline with the candidate blob contour pixel along a predetermined orientation, detect whether the inline pixel is in a first direction or a second direction from the candidate blob contour pixel along the predetermined orientation, and continue to traverse the contour when the inline pixel is in the first direction from the candidate blob contour pixel or detect a second candidate blob contour pixel when the inline pixel is in the second direction from the candidate blob contour pixel.

13. The system of claim 12, wherein the inline pixel is in the first direction from the candidate blob contour pixel, the central processing unit further to determine a second inline pixel that is inline with the candidate blob contour pixel along the predetermined orientation, wherein the second inline pixel and the candidate blob contour pixel are at the same pixel location.

14. The system of claim 13, the central processing unit further to generate contour data associated with traversing the contour from the candidate blob contour pixel to the second inline pixel.

15. The system of claim 12, wherein the inline pixel is in the second direction from the candidate blob contour pixel, and wherein the central processing unit to detect the second candidate blob contour pixel comprises the central processing unit to test pixels in the second direction along the predetermined orientation from the inline pixel for inclusion in the blob.

16. The system of claim 15, the central processing unit further to traverse a second contour associated with the second candidate blob contour pixel to a second inline pixel that is inline with the second candidate blob contour pixel along the predetermined orientation, detect the second inline pixel is in the first direction from the second candidate blob contour pixel along the predetermined orientation, continue to traverse the second contour to determine a third inline pixel that is inline with the second candidate blob contour pixel along the predetermined orientation, wherein the third inline pixel and the second candidate blob contour pixel are at the same pixel location, and generate contour data associated with traversing the second contour from the second candidate blob contour pixel to the third inline pixel.

17. The system of claim 12, the central processing unit further to determine an initial blob pixel within the blob and test pixels along the predetermined orientation in the second direction from the initial blob pixel for inclusion in the blob to detect the candidate blob contour pixel.

18. The system of claim 17, wherein the central processing unit to determine the initial blob pixel within the blob comprises the central processing unit to select a candidate initial blob pixel based on region of interest data associated with the input image and testing the candidate initial blob pixel for inclusion in the blob.

19. At least one non-transitory machine readable medium comprising a plurality of instructions that, in response to being executed on a device, cause the device to perform blob detection by:
   detecting a candidate blob contour pixel associated with a blob in an input image;
   traversing a contour associated with the candidate blob contour pixel to an inline pixel that is inline with the candidate blob contour pixel along a predetermined orientation;
   detecting whether the inline pixel is in a first direction or a second direction from the candidate blob contour pixel along the predetermined orientation; and
   continuing to traverse the contour when the inline pixel is in the first direction from the candidate blob contour pixel or detecting a second candidate blob contour pixel when the inline pixel is in the second direction from the candidate blob contour pixel.

20. The machine readable medium of claim 19, wherein the inline pixel is in the first direction from the candidate blob contour pixel, the machine readable medium comprising further instructions that, in response to being executed on the device, cause the device to perform blob detection by:
   determining a second inline pixel that is inline with the candidate blob contour pixel along the predetermined orientation, wherein the second inline pixel and the candidate blob contour pixel are at the same pixel location.

21. The machine readable medium of claim 20, the machine readable medium comprising further instructions that, in response to being executed on the device, cause the device to perform blob detection by:
   generating contour data associated with traversing the contour from the candidate blob contour pixel to the second inline pixel.

22. The machine readable medium of claim 19, wherein the inline pixel is in the second direction from the candidate blob contour pixel, and wherein detecting the second candidate blob contour pixel comprises testing pixels in the second direction along the predetermined orientation from the inline pixel for inclusion in the blob.

23. The machine readable medium of claim 22, the machine readable medium comprising further instructions that, in response to being executed on the device, cause the device to perform blob detection by:
   traversing a second contour associated with the second candidate blob contour pixel to a second inline pixel that is inline with the second candidate blob contour pixel along the predetermined orientation;
   detecting the second inline pixel is in the first direction from the second candidate blob contour pixel along the predetermined orientation;
   continuing to traverse the second contour;
   determining a third inline pixel that is inline with the second candidate blob contour pixel along the predetermined orientation, wherein the third inline pixel and the second candidate blob contour pixel are at the same pixel location; and
   generating contour data associated with traversing the second contour from the second candidate blob contour pixel to the third inline pixel.

24. The machine readable medium of claim 19, the machine readable medium comprising further instructions that, in response to being executed on the device, cause the device to perform blob detection by:
   determining an initial blob pixel within the blob; and
   testing pixels along the predetermined orientation in the second direction from the initial blob pixel for inclusion in the blob to detect the candidate blob contour pixel.

25. The machine readable medium of claim 24, wherein determining the initial blob pixel within the blob comprises selecting a candidate initial blob pixel based on region of interest data associated with the input image and testing the candidate initial blob pixel for inclusion in the blob.

* * * * *